United States Patent [19]

Myers et al.

[11] 3,951,579

[45] Apr. 20, 1976

[54] APPARATUS FOR FACILITATING ACCESS TO THE MOLD HALVES OF A MOLDING MACHINE

[75] Inventors: Gary L. Myers; Donald W. Staiger, both of Mount Gilead, Ohio

[73] Assignee: Koehring Company, Milwaukee, Wis.

[22] Filed: May 8, 1974

[21] Appl. No.: 467,897

[52] U.S. Cl............................ 425/190; 425/242 R; 425/450.1; 425/167
[51] Int. Cl.² ........................................ B29F 1/00
[58] Field of Search.. 425/242, DIG. 220, DIG. 221, 425/DIG. 222, DIG. 223, 190, 450.1, 167

[56] References Cited
UNITED STATES PATENTS

| | | | |
|---|---|---|---|
| 2,862,238 | 12/1958 | Cuzzi | 425/DIG. 223 |
| 3,262,158 | 7/1966 | Von Reiner et al. | 425/DIG. 222 |
| 3,465,387 | 9/1969 | Allard et al. | 425/DIG. 223 |
| 3,505,708 | 4/1970 | Moslo | 425/242 X |
| 3,528,134 | 9/1970 | Fischbach | 425/242 X |
| 3,587,138 | 6/1971 | Bammert | 425/242 |
| 3,590,436 | 7/1971 | Akesson et al. | 425/242 |
| 3,656,877 | 4/1972 | Aoki | 425/242 X |
| 3,669,599 | 6/1972 | Snider et al. | 425/242 |
| 3,729,283 | 4/1973 | Eggenberger et al. | 425/242 R X |

*Primary Examiner*—J. Howard Flint, Jr.
*Attorney, Agent, or Firm*—Burns, Doane, Swecker & Mathis

[57] ABSTRACT

Access to mold halves disposed on and between opposed stationary and movable platens of a molding machine is facilitated by releasing and at least partially retracting, from the zone between the platens, at least one of a plurality of tie rods extending therebetween. A tie rod is at least partially removed by (1) slidingly translating the movable platen along the tie rods toward the stationary platen, (2) releasing one tie rod from connection with the stationary platen and connecting it to the movable platen, and then (3) slidingly translating the movable platen away from the stationary platen along tie rods remaining connected thereto, to at least partially retract the released tie rod from between the stationary and movable platens.

11 Claims, 8 Drawing Figures

APPARATUS FOR FACILITATING ACCESS TO THE MOLD HALVES OF A MOLDING MACHINE

BACKGROUND AND FIELD OF THE INVENTION

This invention relates generally to apparatus for facilitating access to the mold halves of a molding machine. More particularly, the invention relates to apparatus for releasing and at least partially retracting a tie rod from the zone between opposed movable and stationary platens of a molding machine.

A great many products are today manufactured using suitable molding methods and apparatus. A number of different methods have been developed in this regard including blow, extrusion, and injection molding. Many of the molding machines used in connection with these methods entail opposed stationary and movable platens and opposed mold halves disposed on and between these platens. Often a number of tie rods extend from a portion of the frame of the molding machine through the movable platen to the stationary platen. The movable platen is normally translated toward and away from the stationary platen to abut and separate the mold halves in the course of a molding cycle and the tie rods thus support and guide the movable platen as it is slidingly translated therealong.

Each set of mold halves disposed on and between the platens is normally suited for the manufacture of objects of only a particular size and type. Thus, when sufficient numbers of these objects have been manufactured, the mold halves must be removed and a different set installed to permit the manufacture of different objects. Since the mold halves are normally fastened to the platens, a number of problems occur in connection with the removal and installation of mold halves. One rather troublesome problem concerns the accessability of the molds when tie rods extend between the platens.

Tie rods extending between the stationary are movable platens may obstruct the removal or installation of mold halves by restricting either the accessability of the portions of the mold halves connected to the platens or the movement of the mold halves in the area of the platens prior to connection therewith. This problem may become particularly acute if the mold halves being removed or installed are either large relative to the space available between the tie rods or irregularly shaped.

One approach to the problem presented above has been to remove from between the platens one or more of several essentially permanent tie rods. However, because of the nature of the connections of the tie rods to the molding machine and the size of the tie rods, this may present a rather formidable task. Because the tie rods must often resist large forces during the molding process, they may be quite large and may be connected to the stationary platen and frame of the molding machine by large, heavy-duty connections. Removal of one or more of these tie rods at best entails removal of certain of these large connections and movement of the large tie rods. Once the molds are removed and a different set installed, the tie rods and connections must, of course, be replaced.

As suggested in the preceding paragraph, one of the problems which must be confronted in the removal of a tie rod from between the platens resides in the nature of the connection of the tie rod to the molding machine. Often relatively large longitudinal forces are exerted on the tie rods during the molding operations. The connections of the tie rods to the molding machine should be capable of resisting these forces; however, if a tie rod is to be conveniently removed from between the platens, the connection should be readily removable. From a design standpoint, these two requirements may conflict. The result has been that many connections of tie rods to the molding machine appearing in the prior art may not satisfactorily meet these criteria.

Another difficulty which may occur in the course of removing a tie rod from between the platens of a molding machine and then replacing it, resides in the supervision and control of the movement of the tie rod when disconnected from the molding machine. This may be a particular problem in the case of an automated process entailing the longitudinal retraction and reextension of a tie rod between the platens. If retraction of the tie rod is not carefully supervised and controlled, during removal from between the platens, the tie rod and/or molding machine may be damaged due to over retraction of the tie rod. Similarly, if reextension of the tie rod back into an operating position between the platens is not carefully supervised and controlled, the tie rod and/or molding machine may be damaged or the tie rod may not be properly positioned to be reconnected to the molding machine.

OBJECTS AND SUMMARY OF THE PREFERRED FORMS OF THE INVENTION

In light of the foregoing, it is therefore a general object of the invention to provide apparatus intended to obviate or minimize the problems of the type previously noted.

It is a particular object to provide a novel apparatus in which a tie rod extending between stationary and movable platens of a molding machine can be retracted to substantially remove the tie rod from the zone between the platens thus poviding ready access to the molds.

It is another object of the invention to provide apparatus wherein a tie rod extending between stationary and movable platens of a molding machine can be readily retracted to provide access to the molds and then reextended in an essentially automated process requiring minimal human activity and direct supervision.

It is still another object of the invention to provide a novel apparatus wherein a tie rod intended to be at least partially removed from between stationary and movable platens is connected to the molding machine through a connecting fixture capable of resisting failure due to forces exerted in the course of molding operation and which is nonetheless easily operated to mutually connect and disconnect the tie rod and the molding machine.

It is yet still another object of the invention to provide a novel apparatus wherein the retraction and reextension of a tie rod at least partially removable from the zone between stationary and movable platens of a molding machine can be continuously monitored and controlled.

An apparatus for facilitating access to the molds of a molding machine according to a preferred embodiment of the invention intended to accomplish at least some of the foregoing objects is comprised of a releasable clamp operably associated with a stationary platen of a molding machine. The clamp releasably secures an end of a tie rod extending from connection with the frame of the molding machine through a movable platen and the stationary platen to normal engagement with the clamp. The clamp pivotally opens and closes to respectively release and clamp the tie rod relative to the stationary platen. The invention further includes a releasable connector operably associated with the movable platen. When the movable platen, which is slidably supported at least in part by the tie rod, is slidingly translated toward the stationary platen and the tie rod is released by the clamp, the releasable connector is employed to connect the tie rod to the movable platen for movement therewith. Upon sliding translation of the movable platen away from the stationary platen, the tie rod released from connection with the stationary platen is retracted and at least partially removed from the zone between the platens.

THE DRAWINGS

Other objects and advantages of the present invention will become apparent with reference to a detailed description to follow of a preferred embodiment thereof as illustrated in the drawings wherein like reference numerals have been applied to like elements and in which:

FIGS. 1(a), 1(b), and 1(c) illustrate in side elevation an embodiment of the invention and a sequence of operation thereof;

DETAILED DESCRIPTION

Figure 1A:
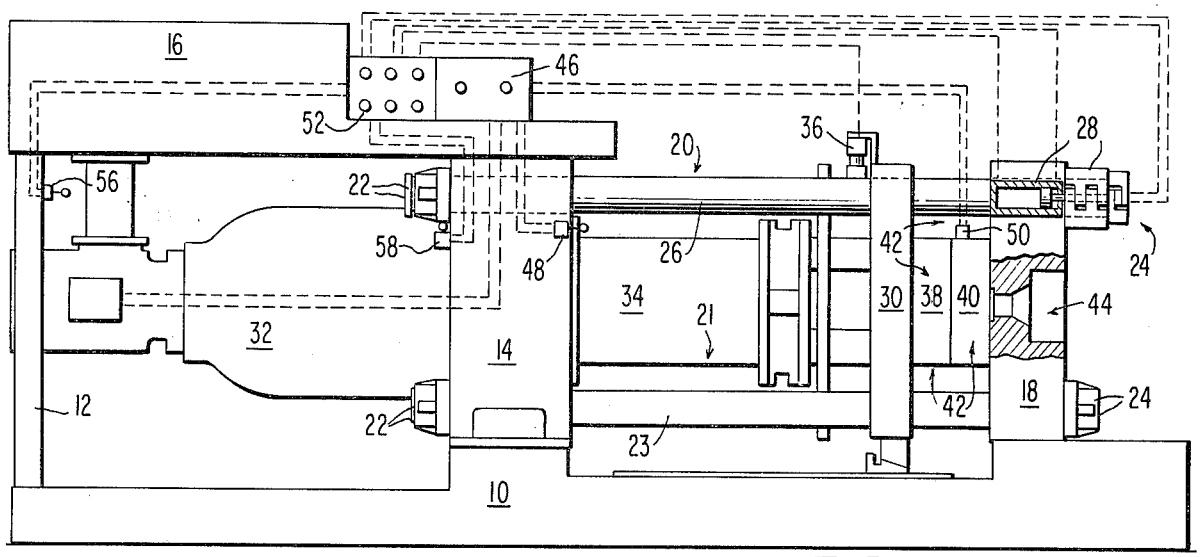
Figure 1B:
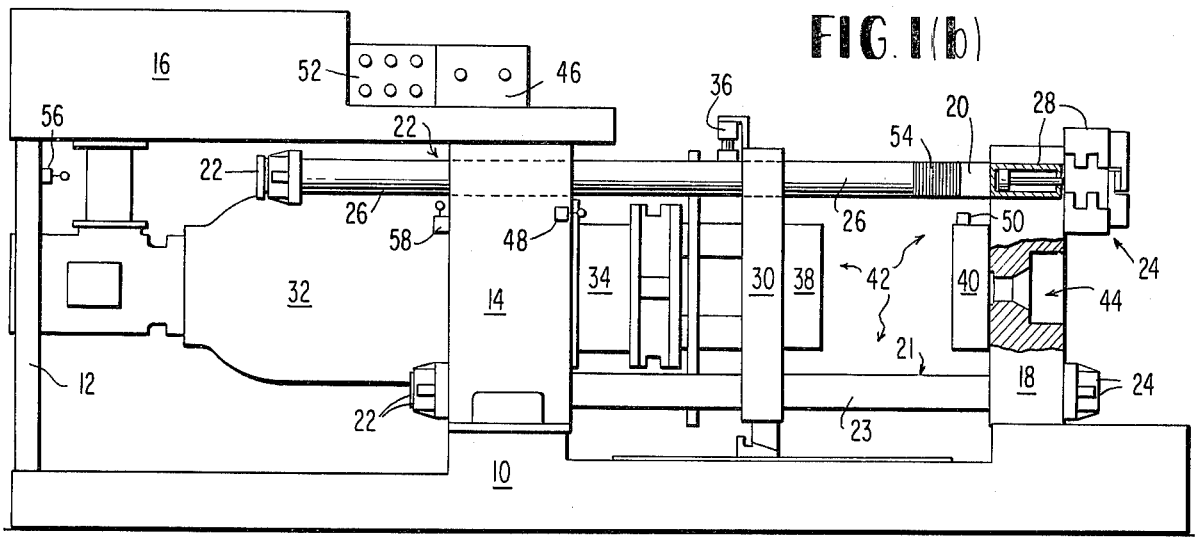
Figure 1C:
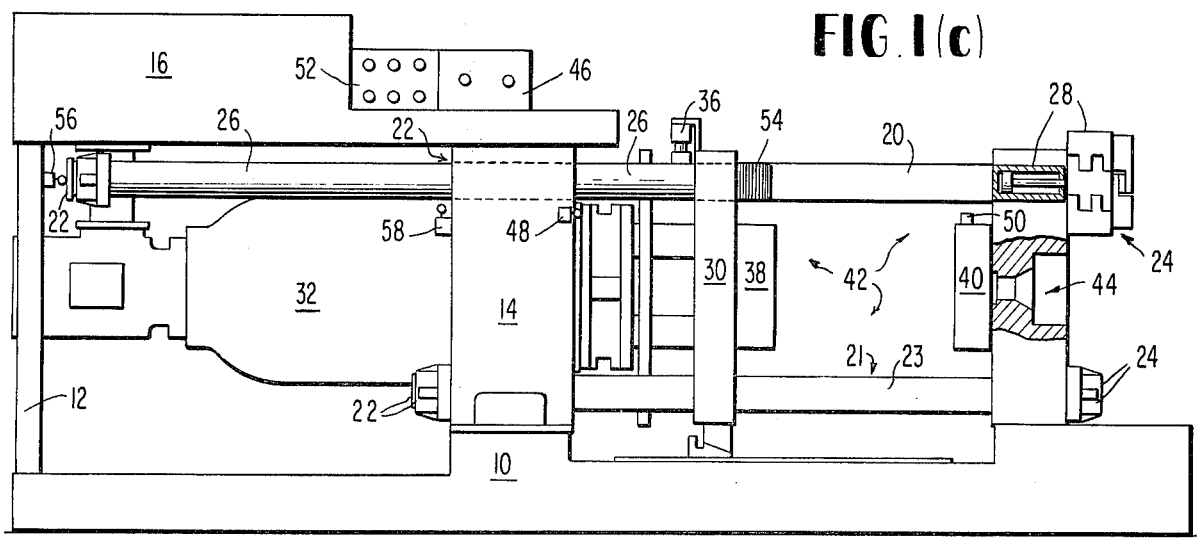

Referring now to FIGS. 1(a), 1(b), and 1(c), a side elevation can be seen of an embodiment of the invention showing a sequence of operation facilitating access to the molds of a molding machine. The molding machine itself includes a lower, horizontal supportive portion 10 and vertical supported portions including end and middle frames 12 and 14 respectively. The end frame 12 and the middle frame 14 serve to support an upper frame 16. The middle frame serves in conjunction with a stationary platen 18 to support a plurality of tie rods 20.

The tie rods 20, 21, 23, and 26 are preferably four in number and extend through the middle frame 14 and the stationary platen 18. Longitudinal translation of the tie rods during molding operations is prevented by means of large nuts 22 and 24 which are threaded on opposite ends of tie rods 20, 21, and 23. The tie rods normally all remain continuously connected to the stationary platen and extend between the stationary and movable platens. However, as will be more fully described in the course of discussion to follow, tie rod 26 is releasably retained in place by a suitable clamping means 28 with which it is normally engaged during molding operations and can be retracted from the zone between the stationary and movable platens.

Intermediate the middle frame and the stationary platen is disposed a movable platen 30. The movable platen 30 is slidingly supported by the tie rods 20, 21, 23, and 26 which pass therethrough. The tie rods, including the removable tie rod 26, guide the movement of the movable platen 30 as it reciprocates toward and away from the stationary platen 18 during molding operations. The reciprocation of the movable platen is accomplished by means of a piston and cylinder arrangement 32 which is connected through a piston rod 34 to the movable platen 30. As the piston slides within the cylinder, the piston rod 34 extends and retracts to reciprocate the movable platen 30. Suitable means for releasably connecting the tie rod 26 to the movable platen 30 is disposed on the movable platen and can be conveniently referred to as a "grabber" 36. In conjunction with the movable platen 30, the grabber 36 constitutes a retracting means for retracting the releasable tie rod 26 upon release of the clamp 28.

Mold halves 38 and 40 are disposed between and connected to the movable and stationary platens respectively. These mold halves may be suitably connected to the platens in any convenient manner. The molds 38 and 40 in some cases may be rather large and cumbersome. Problems associated with mold halves of large size may be aggrevated by the fact that the tie rods 20, 21, 23, and 26 may tend to interfere with free access by workmen to the mold halves should it be necessary to remove them and install different mold halves. If the mold halves are sufficiently large in relation to the space available in the zone 42 between the tie rods and between the platens, it may be necessary to remove one or more of the tie rods in order to remove the mold halves. The removal of the tie rod should be fairly complete otherwise it may be necessary for a mold half to be translated parallel to the tie rods to clear the ends thereof. Analogous problems can occur in connection with oddly shaped mold halves.

Once installed, a set of mold halves normally remain in place over a number of operating cycles of the molding machine. Typically, the movable platen is reciprocated by means of the piston and cylinder arrangement to open and close the mold as described above. During the period of time in which the mold halves are in abutment and a complete mold cavity is formed by the combined molds, a charge of material is formed within the mold into the desired product. If an injection molding machine is employed, the material may be injected by a suitable injection device through an orifice 44 formed in the stationary platen. In this case the injection device is not shown in the interests of simplicity. Once an article has been molded, the piston and cylinder arrangement 32 retracts the movable platen and the mold halves are separated to allow removal of the molded item.

Movement of the movable platen by the piston and cylinder arrangement can be controlled in any suitable manner. For instance, either manual or automatic controlling means such as that illustrated at 46 can be employed to effect appropriate hydraulic extension and retraction of the piston. The extent of the extension and retraction of the movable platen can be monitored and controlled by means of any appropriate limiting means, such as limit switches 48 and 50 suitably integrated with the molding machine.

Once the desired number of molding cycles have been completed and the desired number of articles have been formed, it will usually be necessary to change the mold halves to manufacture differently shaped articles. The novel apparatus for facilitating access to the molding zone according to the present invention takes advantage of the intended normal function of the molding machine to retract and at least partially remove the tie rod 26 from the zone between the stationary platen 18 and the movable platen 30. As illustrated in FIG. 1(a), a translation controlling means 46 is employed to effect appropriate sliding translation of the movable platen 30 along the supportive tie rods 20, 21, 23, and 26 toward the stationary platen 18. Once the movable platen 30 has reached a desired position relative to the stationary platen 18, movement of the movable platen is interrupted and the grabber 36, in response to a suitable signal from a suitable retraction controlling means 52, engages and connects the tie rod 26 to the movable platen 30 for movement therewith. The end of tie rod 26 is released by the clamping means 28 in response to an appropriate signal from the retraction controlling means 52 to a fluid pressure actuable releasing means operably associated with the clamping means. The clamping means 28 otherwise normally clampingly locks the tie rod against longitudinal movement relative to the stationary platen. The clamping means 28 is illustrated in FIG. 1(a) in its normally closed posture and is illustrated in FIGS. 1(b) and 1(c) in an open posture in which the tie rod 26 is released.

FIG. 1(b) illustrates retraction of the movable platen 30 from a position adjacent the stationary platen 18. The tie rod 26 has been connected to the movable platen 30 by the grabber 36 and is shown partially retracted from the zone between the stationary and movable platens during a first retracting phase. The end 54 of the releasable tie rod 26 has been pulled from the area of the clamping means 28 and the stationary platen 18 incident to the sliding translation of the movable platen 30 along the tie rods 20, 21, and 23 which remain connected to the stationary platen 18 to support and guide the movement of the movable platen. The movable platen 30 is retracted by the piston and cylinder arrangement 32 until the platen and tie rod reach a desired position.

Once the movable platen reaches the desired position, movement thereof is interrupted by an appropriate signal from the translation controlling means 46. In a second retracting phase grabber 36 next releases the tie rod 26 from connection with the movable platen 30 in response to an appropriate signal from the retraction controlling means 52. The movable platen is now free to be slidingly translated relative to the tie rod 26 a desired distance back toward the stationary platen along the tie rods 20, 21, and 23 which remain connected to the stationary platen. It should be emphasized that the released tie rod 26 remains essentially stationary relative to the movable platen 30 as the movable platen is translated back along the tie rods 20. It should also be noted that in translating the movable platen 30 back along the tie rods 20, 21, and 23 the movable platen is displaced relative to the tie rod 26 a distance less than the length of the released tie rod which extends from the movable platen toward the stationary platen. In other words, the movable platen is displaced relative to the tie rod 26 toward the stationary platen 18 a distance less than that required to displace the movable platen 30 beyond the free, released end 54 of the tie rod. However, though the movable platen should not be displaced beyond the free end 54 of the released tie rod, the movable platen can be translated along substantially the entire length of the portion of the tie rod 26 which extends between the movable and stationary platens.

When the movable platen 30 has been slidingly translated back along the tie rods 20, 21, and 23 and is positioned as desired relative to the stationary platen 18, an appropriate signal from the translation controlling means again interrupts the movement of the platen. A signal from the retraction controlling means 52 causes the grabber 36 to engage the tie rod 26 and connect it to the movable platen for movement therewith. The tie rod can undergo further retraction in the manner illustrated in FIG. 1(b) and described in connection with the discussion thereof. The steps of moving the movable platen toward the stationary platen and connecting the released tie rod therewith, followed by retracting the movable platen, and subsequently disconnecting the tie rod from the movable platen as described above can be repeated cyclically until the tie rod 26 is either fully retracted or retracted as desired.

FIG. 1(c) illustrates the tie rod 26 in a fully retracted posture. When the tie rod 26 is fully retracted, a first limit switch 56 or other similar device is contacted by the nut 22. The first limit switch 56 is operably associated with the retraction controlling means 52 and serves to indicate when the tie rod 26 has reached a prescribed degree of retraction. Over retraction and possible damage to the tie rod or other elements of the molding machine can thus be avoided.

Once the releasable tie rod 26 has been retracted and access gained to the molding zone, the tie rod 26 must be restored to its original position prior to the initiation of molding operations. The tie rod 26 is restored to its original position by reversal of the procedure described above in connection with the retraction of the tie rod. Accurate restoration of the tie rod 26 to its original position in engagement with the clamping means 28 is facilitated by a second limit switch or similar device 58 which is operably associated with the retraction controlling means 52. The second limit switch 58 may be disposed on the middle frame 14 adjacent the releasable tie rod 26. As FIG. 1(b) indicates, the limit switch 58 is normally out of contact with any moving portion of the molding machine. However, as illustrated in FIG. 1(a), when the releasable tie rod 26 assumes an appropriately restored posture, the nut 22 contacts the limit switch 58. When contacted by the nut 22, the limit switch indicates that the tie rod 26 has been properly restored. In this way, the limit switch 58 monitors and controls the degree of restoration or reextension of the tie rod 26.

It can be clearly seen from FIG. 1(c) that retraction of the tie rod 26, to at least partially remove it from the zone 42 between the stationary and movable platens, affords substantially complete and ready access to the mold halves 38 and 40. It is true that three of the four tie rods remain in place between the movable and stationary platens; however, at least two sides of the mold halves are exposed upon retraction of the tie rod 26 and in all but unusual circumstances this should suffice to allow convenient removal and installation of mold halves. If unusual molds are to be used, it would certainly fall within the ambit of the inventive concept presented herein to provide for retraction of more than one tie rod. It should now be clear that the novel apparatus according to the present invention provides an arrangement wherein tie rods can be readily and accurately retracted and at least partially removed from the zone between the platens of a molding machine and then properly restored therebetween by an essentially automated process.

Figure 2:
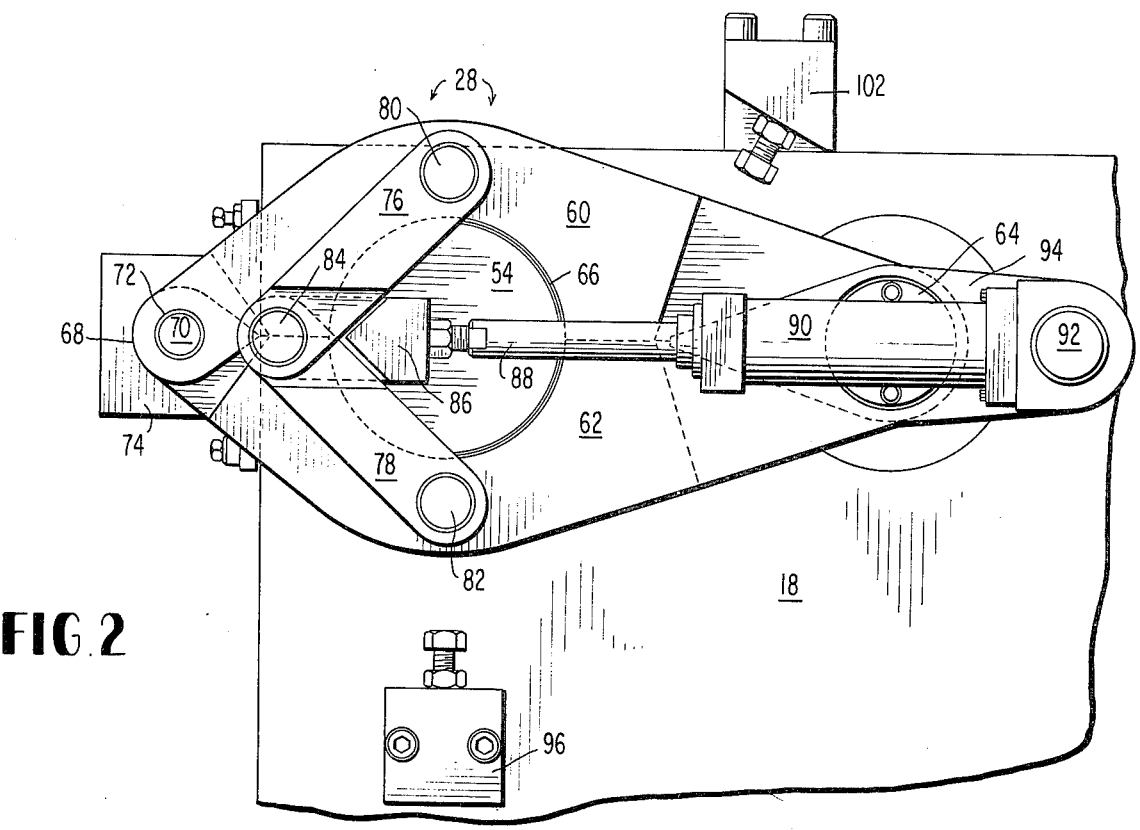
FIG. 2 is an end elevation of a clamp in a closed posture wherein the clamp engages an end of a tie rod.

Referring now to FIG. 2, an end elevation can be seen of a clamp employed to releasably connect a tie rod to the stationary platen of a molding machine. The clamp 28 can be seen in a normal, closed posture in engagement with the end 54 of a tie rod. The clamp is comprised of opposed, complimentary, semi-circular means in the form of clamping arms 60 and 62. Each of the clamping arms 60 and 62 are pivotally connected to the stationary platen 18 at a pivotal connection 64 and close to enclose and secure the end 54 of the tie rod to the stationary platen. A plurality of annular grooves and ridges illustrated generally by the broken line at 66 facilitate the connection of the tie rod to the stationary platen and will be more fully described in connection with the discussion of FIG. 5. The arms 60 and 62 pivot independently and are coupled when closed by a pin connector in the form of a sliding bolt 70 passing through a lap joint 68 formed in the arms opposite the pivotal connection 64. The operation of the lap joint and bolt will be described in more detail in subsequent discussion; however, it should be apparent that the bolt 70 rigidly couples the clamping arms 60 and 62 upon insertion within an elongated passage 72 passing through the lap joint 68 in the clamping arms. The bolt is operated by a fluid pressure operable arrangement located generally at 74 behind the lap joint 68 as seen in FIG. 2.

A pair of opposed, mutually connected linking members 76 and 78 extend in a symmetric, mutually inclined angular relation to opposed points of pivotal connection 80 and 82 with the clamping arms 60 and 62. The linking members 76 and 78 are mutually, pivotally connected by a pin connector 84 and intersect to form an acute angular relationship when the clamp is closed. When the clamp assumes the posture illustrated in FIG. 2, the longitudinal axis of the pin connector 84 falls in a plane defined by the longitudinal axis of the tie rod and the axis of rotation of the pivotal connection 64 of the clamping arms to the stationary platen 18. A third linking member 86 is intercalated between and pivotally connected to the linking members 76 and 78. The connection is made by the pin connector 84 which passes through the third linking member. The third linking member serves to connect the connecting pin 84 and thus the linking members 76 and 78 to the end of a piston rod 88 which extends from a fluid pressure operable releasing means in the form of a piston and cylinder arrangement 90. The piston and cylinder arrangement is pivotally connected at 92 to an extension 94 of the clamping arm 62. As will be more fully described in connection with the discussion of FIG. 3, translation of the connecting pin 84 by the piston and cylinder arrangement 90 through the piston rod 88 and third linking member 86 serves to open and close the clamping arms 60 and 62.

Figure 3:
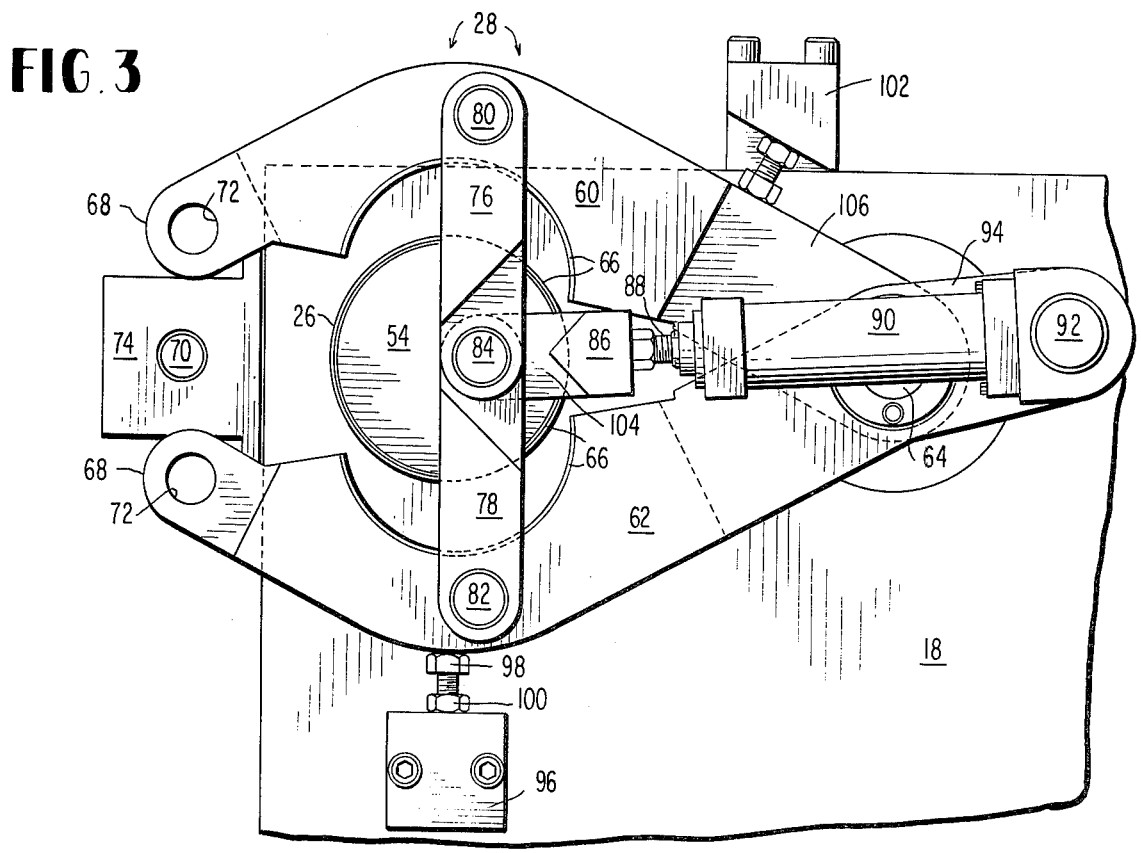
FIG. 3 is an end elevation of the clamp of FIG. 2 in an open posture wherein the end of a tie rod is released from engagement therewith.

Referring now to FIG. 3, an end elevation can be seen of the clamp 28 in a open posture in which the tie rod 26 is released from connection with stationary platen 18. In order to open the clamp the sliding bolt 70 must be retracted to clear the elongated passage 72 formed in the lap joint 68. Once the bolt 70 has been retracted from the elongated passage 72, a fluid pressure actuable translating means, in the form of the third linking member 86, the piston rod 88 and the piston and cylinder arrangement 90 displaces the pin connector 84 essentially toward the axis of rotation of the pivotal connection 64 of the clamping arms 60 and 62. This displacement is effected by the retraction of the piston rod 88 by the piston and cylinder arrangement in response to a signal received from the retraction controlling means 52 mentioned in connection with FIG. 1. As the connecting pin 84 is displaced by retraction of the piston rod 88, the angular relation between the linking members 76 and 78 increases and the semi-circular portions of the clamping arms 60 and 62 open to release the tie rod. Similarly, the semi-circular portions of the clamping arms are closed by reversing the movement of the piston rod so that the angular relation between the linking members 76 and 78 decreases. This smaller angular relation is clearly illustrated in FIG. 2.

The clamping arms 60 and 62 are each pivotally connected to the stationary platen 18 and must therefore be maintained in a proper vertical position relative to the tie rod 26 when the tie rod is released. In this regard, a vertically adjustable support is provided comprising a mounting block 96 disposed on the stationary platen and a threaded pedestal 98 locked in place by an appropriate lock nut 100. A similar arrangement 102 contacts the clamp from above.

Though it was indicated in connection with the discussion of FIG. 2 that the third linking member 86 was intercalated between and pivotally connected to the linking members 76 and 78 and that the clamping arms 60 and 62 were pivotally connected to the stationary platen, FIG. 3 more clearly illustrates the particular manner in which these elements are connected. Both the linking members and the clamping arms are pivotally connected at lap joints, that is, the thicknesses of these members are reduced in the area of the pivotal connections to allow the members to assume an essentially coplanar posture minimizing the total thickness of the assembled members. In the case of the linking members 76 and 78, the thicknesses are further reduced between the members to allow for the intercalation of the third linking member 86. It can be noted from FIG. 3 that the third linking member 86 is not of uniform thickness. The portion 104 intercalated between the linking members 76 and 78 is substantially thinner than the portion directly connected to the piston rod 8. It will also be noted that the thicker portion of the third linking member 86 is V-shaped at one end to accommodate the linking members 76 and 78 as they assume the angular relation illustrated in FIG. 2.

Figure 4:
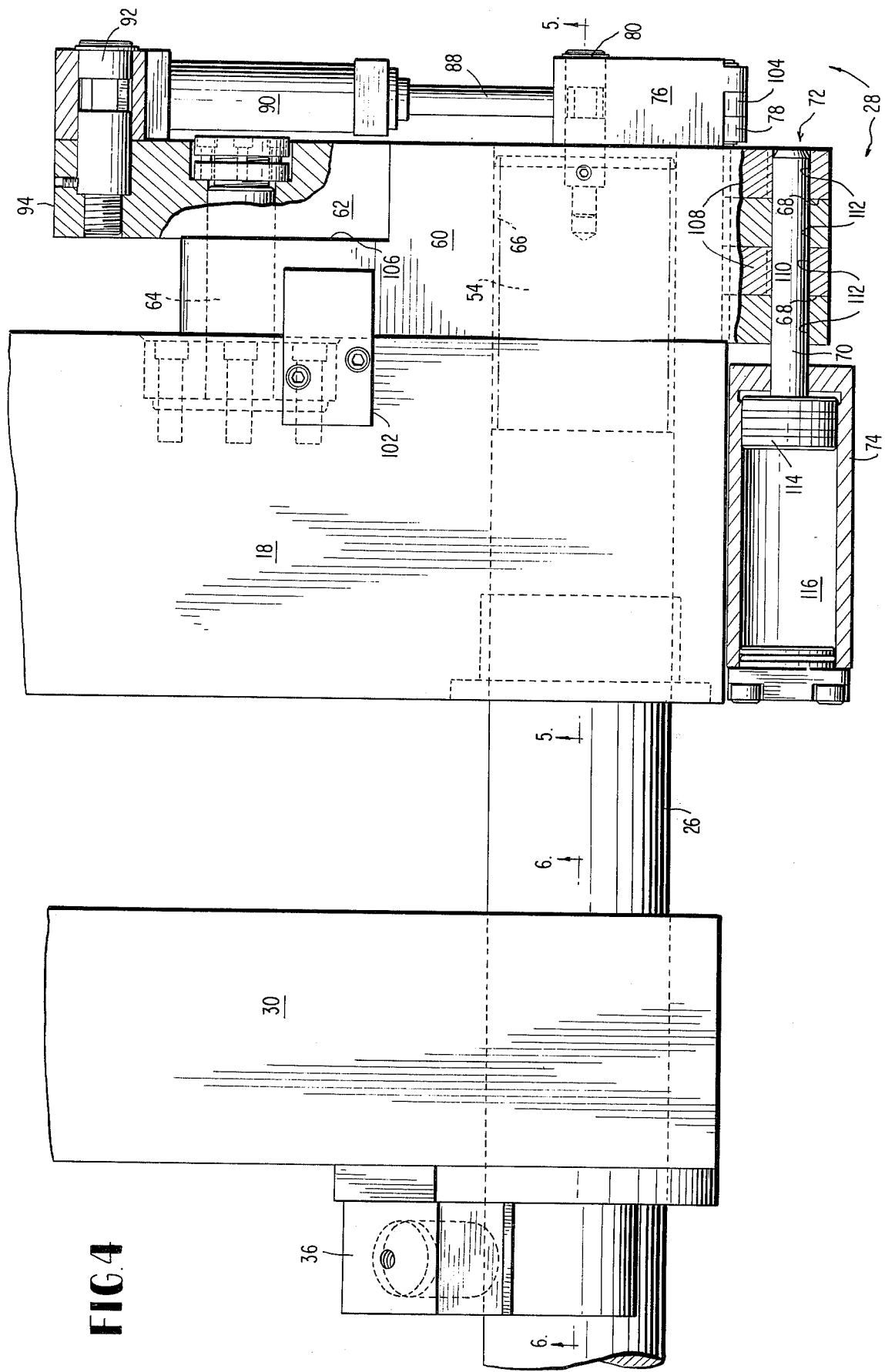
FIG. 4 is a partial top view of an end portion of the machine of FIGS. 1(a), 1(b), and 1(c), partly in cross-section, showing the clamp of FIG. 2 employed to connect an end of a tie rod to a stationary platen and showing a connector for connecting the tie rod to a movable platen.

Referring now to FIG. 4, a top, partially sectional view can be seen of the clamp 28 employed to secure the end 54 of the tie rod 26 to the stationary platen 18. The tie rod 26 can be seen to extend through the movable platen 30 and the stationary platen 18 into a position of normal engagement with the clamp 28. A top view of the grabber 36 can also be seen as it is disposed on the movable platen. The clamp is shown closed and pivotally connected by the pivotal connection 64 to the stationary platen. The pivotal connection 64 takes the form of a pin suitably connected to the stationary platen. The clamping arms 60 and 62 can be retained on the pin 64 as desired so long as the arms remain free to pivot about the longitudinal axis of the pin. The lap joint between the arms and through which the pin 64 passes can be clearly seen at 106. The piston and cylinder arrangement 90 is shown as it is pivotally connected by the pivotal connection 92 to the extension 94 of the clamping arm 62. The piston rod 88 of the piston and cylinder arrangement 90 extends to connect to the linking member 86 which is in turn pivotally cnnected to the linking memberss 76 and 78 through the thin portion 104 intercalated therebetween.

A portion of the clamp is shown in cross-section and this portion includes the lap joint and the sliding bolt 70 which, as mentioned in connection with the discussion of FIG. 2, couples together the ends of the clamping arms. As illustrated, the lap joint through which the arms 60 and 62 are coupled is formed by multiple overlapping fingers 108 and 110 disposed respectively on the ends of the clamping arms 60 and 62 opposite the pivotal connection 64. A plurality of apertures 112 is disposed in the fingers and each aperture intersects overlapping portions of the fingers 108 and 110. As suggested in connection with the discussion of FIG. 2, the apertures 112 register when the arms 60 and 62 are closed to form a single elongated passage 72.

When the clamping arms are closed and the apertures align to form the elongated passage 72, the arms can be rigidly coupled by the sliding bolt 70. The bolt is fluid pressure operable and functions in response to signals received from the retraction controlling means 52 mentioned in connection with the discussion of FIG. 1. As illustrated the bolt 70 depends from a piston 114 disposed in a cylinder 116. The bolt 70 may be either retracted from the elongated passage 72 formed by the apertures or inserted into the passage to rigidly couple the clamping arms. Thus, by combining the multiple overlapping fingers 108 and 110 and the sliding bolt 70, a coupling can be provided which is easily uncoupled but which is nonetheless of sufficiently high strength to insure that the clamp remains closed despite stresses which may be applied in the course of a molding operation.

Figure 5:
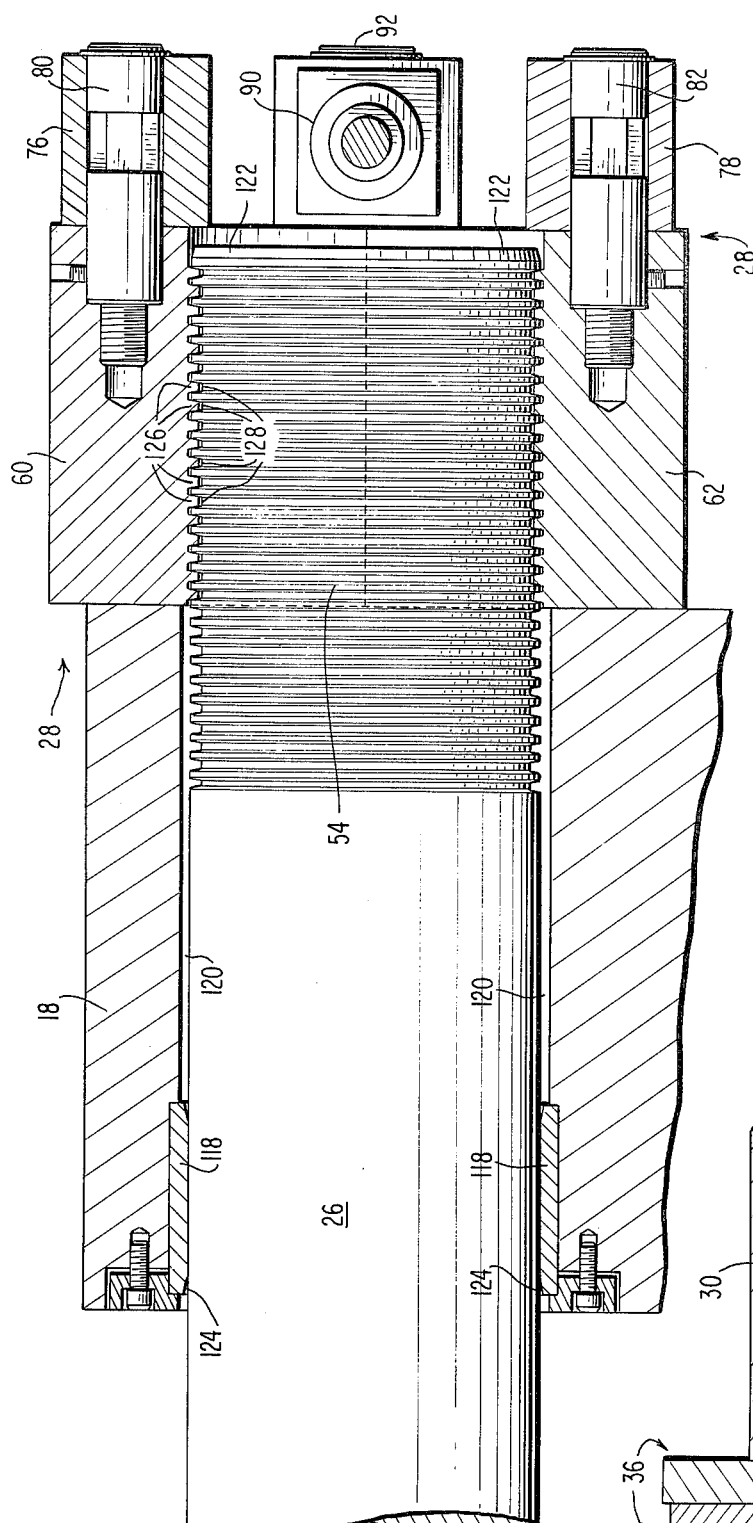
FIG. 5 is a vertical, cross-sectional view of the tie rod and clamp taken along the line 5-5 of FIG. 4.

Referring now to FIG. 5, a vertical cross-sectional view can be seen of the tie rod and clamp taken along the line 5-5 of FIG. 4. The releasable tie rod 26 can be seen extending through a stationary platen 18 into engagement with the clamp 28 which connects the tie rod to the stationary platen. Since the tie rod 26 must be retractable, it must be free to slide from within the stationary platen. To this end, the aperture 120 which receives the end 54 of the tie rod 26 is enlarged to allow ready withdrawal and insertion of the tie rod. However, the tie rod must also be maintained in a proper relation with the remaining tie rods to insure proper movement of the movable platen thereon. A bushing 118 is therefore provided in a portion of the aperture 120 to closely surround and insure that the tie rod is properly supported by the stationary platen 18 and is maintained in a proper spatial relation with the tie rods which continue to be connected to the stationary platen. It is also important that the tie rod 26 smoothly slide into the bushing without striking the edge thereof or otherwise contacting the bushing in a manner which might prove structurally damaging. The end of the tie rod is therefore chamfered as illustrated at 122. Similarly, the inside diameter of the portion of the bushing 118 facing the movable platen is chamfered at 124 in a supplementary manner.

A plurality of semi-circular ridges 126 are disposed along the semi-circular portions of the clamping arms 60 and 62. These semi-circular ridges 126 are configured and spaced to fit within a plurality of receiving circumferential grooves 128 disposed around and along the end 54 of the tie rod 26. The ridges 126 and grooves 128 have compatible, gentle V-shaped configurations to accommodate for minor inaccuracies in the positioning of the tie rod 26 during restoration. The ridges fit snuggly within the grooves when the clamping arms 60 and 62 are closed and thus provide a high strength connection analogous to that of a threaded fastener. It should thus be readily appreciated at this point, recalling the substance of the discussions of FIGS. 2 through 4, that the clamp 28 affords a heavy-duty connection for connecting the tie rod to the stationary platen. Once the clamp 28 is closed and the ridges of the clamping arms are fitted within the grooves of the tie rod, displacement of the tie rod longitudinally toward the movable platen is resisted by reason of the abutment of the clamp against the stationary platen. Such a connection should be capable of resisting forces developed incident to molding operations and should not be vulnerable to failure either in the body of the clamp itself or at the interface between the clamping arms and the tie rod and yet be easily operable to connect or disconnect the tie rod to or from the stationary platen.

Figure 6:
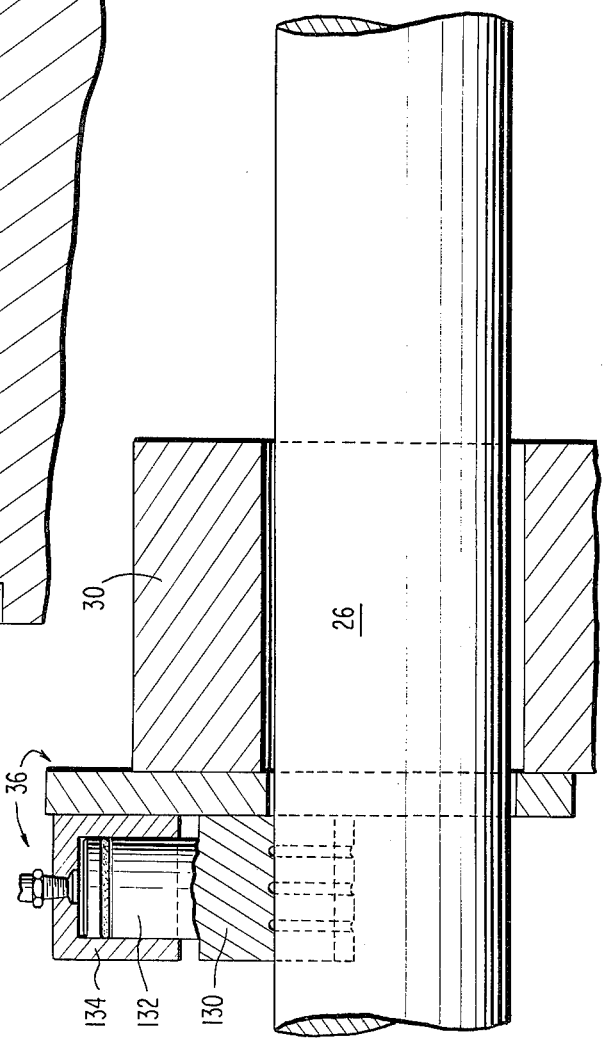
FIG. 6 is a vertical, cross-sectional view of the tie rod and connector taken along the line 6-6 of FIG. 4.

Referring now to FIG. 6, a vertical cross-sectional view can be seen of the tie rod and grabber as taken along the line 6—6 of FIG. 4. A portion of the releasable tie rod can be seen as it passes through the movable platen 30. The grabber 36 is shown as it is disposed on the movable platen. Though the grabber can be comprised of any arrangement capable of connecting the tie rod to the movable platen, it is preferred to employ a fluid pressure operable frictional brake 130. The brake, as shown, depends from a piston rod 132 of a piston and cylinder arrangement 134. Upon receiving an appropriate signal from the retraction controlling means the grabber is operable to frictionally engage and brake the movement of the movable platen relative to the tie rod 26 and thereby connect the tie rod to the movable platen. Alternatively the brake of the grabber can be lifted from engagement with the tie rod to disconnect the tie rod from the platen.

SUMMARY OF MAJOR ADVANTAGES

The apparatus according to the present invention provides the important advantage that a tie rod extending between stationary and movable platens can be substantially removed from the zone between the platens to provide ready access to the molds.

A further advantage of the invention is that the tie rod extending between the stationary and movable platens can be readily retracted and then restored to its original position in an essentially automated process requiring minimal human activity or direct supervision.

The invention also provides the further significant advantage that the tie rod which is to be at least partially removed from between stationary and movable platens is connected to the molding machine by a connecting fixture capable of resisting forces developed in the course of a molding operation but which is nonetheless easily operated to mutually connect and disconnect the tie rod and the molding machine.

An additional advantage of the invention is that the retraction and restoration of the tie rod can be continuously monitored and controlled.

In describing the invention, reference has been made to a preferred embodiment. However, those skilled in the art and familiar with the disclosure of the invention will recognize certain additions, deletions, substitutions, or other modifications which may be made within the purview of the invention as defined in the claims.

What is claimed is:

1. In molding apparatus of the type having
a frame;
opposed first and second mold halves;
a stationary platen connected to said frame for carrying said first mold half;
a movable platen connected to said frame for movably carrying said second mold half in reciprocating motion relative to said first mold half;
a plurality of tie rods for guiding movement of said movable platen relative to said stationary platen, said tie rods being normally supported at opposed portions thereof by said frame and said stationary platen and slidably supporting said movable platen; and
means for reciprocating said movable platen relative to said stationary platen to bring said mold halves together for receiving material to be molded and for separating said mold halves to permit removal of a molded part;
the improvement comprising:
fluid pressure actuable clamping means connected to said stationary platen for releasably securing at least one of said tie rods to said stationary platen, said clamping means comprising: a pair of clamp arms pivotably connected at one end to said stationary platen and having at the opposite ends thereof opposed, complementary semi-circular means for alternately, mutually closing to enclose and secure to said stationary platen and opening to release from connection with said stationary platen an end of said one tie rod extending through said stationary platen,
multiple overlapping connecting means disposed at ends of said clamp arms opposite said pivotal connection to said stationary platen and having a plurality of apertures extending therethrough, said apertures registering with one another to form a single, elongated passage when said semi-circular means is closed, and
a fluid pressure operable bolt insertable through said elongated passage to rigidly couple said semi-circular means when closed; and
retracting means operably associated with said movable platen for retracting said one tie rod from between said movable and said stationary platens.

2. Apparatus according to claim 1 wherein:
said apparatus further comprises an annular bushing means disposed in said stationary platen for closely surrounding a portion of the length of said one tie rod to support said tie rod in prescribed relation to the remaining tie rods of said plurality;
the end of said one tie rod supported through said bushing means by said stationary platen is chamfered and extends removably through said stationary platen to normal engagement with said semi-circular means, and
the inside diameter of the end of said bushing means facing said movable platen is chamfered in a manner essentially supplementary to the chamfer of the end of said one tie rod.

3. Apparatus according to claim 1 further comprising:
a plurality of circumferential grooves disposed longitudinally along said end of said one tie rod extending through said stationary platen and normally engaged and enclosed by said semi-circular means; and
a plurality of semi-circumferential ridges on said semi-circular means, said ridges being configured and spaced to fit within said grooves in said tie rod upon closure of said semi-circular means.

4. Apparatus according to claim 3 further comprising:
first limiting means connected to said frame for indicating that said retracting means has retracted said one tie rod a prescribed distance from between said movable and said stationary platens.

5. Apparatus according to claim 4 further comprising:
second limiting means connected to said frame for indicating that said retracting means has restored said one tie rod to a position essentially coinciding with the position of said one tie rod prior to retraction thereof from between said movable and said stationary platens.

6. Clamping apparatus comprising:
a pair of clamp arms pivotally connected together at one end and having at the opposite ends thereof opposed gripper portions; and
linking means for alternately opening and closing said gripper portions, said linking means including opposed, mutually connected linking members individually extending in symmetrical, mutually inclined, angular relation to said clamp arms,
a pin connector coupling said linking members at said mutual connection, and
translating means for translating said pin connector to open and close said gripper portions.

7. A molding apparatus comprising:
a frame;
opposed first and second mold halves;
a first platen carrying said first mold half;
a second platen carrying said second mold half;
a plurality of tie rod means extending between said frame and said first platen;
said tie rod means and said second platen being relatively movable, with said second platen being supported by said tie rod means,
means for reciprocating said first and second platens relatively toward and away from one another to bring said mold halves together for receiving molding material and to separate said mold halves to permit removal of a molded part; releasable securing means comprising:
a pair of clamp arms for securing a selected one of said tie rod means against movement relative to said first platen during the relative movement of said mold halves toward and away from one another and for releasing said selected tie rod means for movement completely away from said first platen relative to remaining tie rod means when it is desired to remove said selected tie rod means from the vicinity of said first platen, said clamp arms being pivotably connected at one end to said first platen and having at the opposite ends thereof opposed, complementary semi-circular means for closing into engagement with said selected tie rod means and opening away from engagement with said selected tie rod means;
power actuating means, including a first motor, for moving said clamp arms between a securing position wherein said selected tie rod means is secured against movement relative to said first platen, and a releasing position wherein said selected tie rod means is released for movement completely away from said first platen;

multiple overlapping connecting means disposed at ends of said clamp arms opposite said pivotal connection to said first platen and having a plurality of apertures extending therethrough, said apertures registering with one another to form a single, elongated passage when said semi-circular means is closed; and a fluid pressure operable bolt insertable through said elongated passage to rigidly couple said semi-circular means when closed;

said selected tie rod means being configured for movement completely away from said first platen in response to movement of said clamp arms to said releasing position by said power actuating means;

an annular bushing means disposed in said first platen for closely surrounding a portion of the length of said selected tie rod means to support said selected tie rod means in prescribed relation to the remaining tie rod means;

the end of said selected tie rod means being supported through said bushing means by said first platen is chamfered and extends removably through said first platen to normal engagement with said securing means; and the inside diameter of the end of said bushing means facing said second platen being chamfered in a manner essentially complementary to the chamfer of the end of said selected tie rod means; and coupling means for selectively coupling said selected tie rod means for movement with said second platen in a direction away from said first platen such that reciprocation of said second platen by said reciprocating means withdraws said selected tie rod means completely away from the vicinity of said first platen.

8. Apparatus according to claim 7 wherein said coupling means comprises a frictional brake mounted on said second platen, and a fluid pressure actuating motor for moving said brake into and out of engagement with said selected tie rod means.

9. A molding apparatus comprising:

a frame;

opposed first and second mold halves;

a first platen carrying said first mold half;

a second platen carrying said second mold half;

a plurality of tie rod means extending between said frame and said first platen;

said tie rod means and said second platen being relatively movable, with said second platen being supported by said tie rod means, means for reciprocating said first and second platens relatively toward and away from one another to bring said mold halves together for receiving molding material and to separate said mold halves to permit removal of a molded part;

releasable securing means comprising:

a pair of clamp arms for securing a selected one of said tie rod means against movement relative to said first platen during the relative movement of said mold halves toward and away from one another and for releasing said selected tie rod means for movement completely away from said first platen relative to remaining tie rod means when it is desired to remove said selected tie rod means from the vicinity of said first platen, said clamp arms being pivotably connected at one end to said first platen and having at the opposite ends thereof opposed, complementary semi-circular means for closing into engagement with said selected tie rod means and opening away from engagement with said selected tie rod means;

power actuating means, including a first motor, for moving said clamp arms between a securing position wherein said selected tie rod means is secured against movement relative to said first platen, and a releasing position wherein said selected tie rod means is released for movement completely away from said first platen;

opposed, mutually connected linking members individually extending in symmetrical, mutually inclined, angular relation to opposed points of connection with said clamp arms;

a pin connector coupling said linking members at said mutual connection, the longitudinal axis of said pin being contained, when said semi-circular means is closed, in a plane defined by the longitudinal axis of said tie rod and the axis of rotation of said pivotal connection of said clamp arms to said first platen; and fluid pressure actuable translating means for translating said pin connector relative to said opposed connections to increase said angular relation and open said semi-circular means and to decrease said angular relation and close said semi-circular means;

said selected tie rod means being configured for movement completely away from said first platen in response to movement of said clamp arms to said releasing position by said power actuating means;

an annular bushing means disposed in said first platen for closely surrounding a portion of the length of said selected tie rod means to support said selected tie rod means in prescribed relation to the remaining tie rod means;

the end of said selected tie rod means being supported through said bushing means by said first platen is chamfered and extends removably through said first platen to normal engagement with said securing means; and the inside diameter of the end of said bushing means facing said second platen being chamfered in a manner essentially complementary to the chamfer of the end of said selected tie rod means; and coupling means for selectively coupling said selected tie rod means for movement with said second platen in a direction away from said first platen such that reciprocation of said second platen by said reciprocating means withdraws said selected tie rod means completely away from the vicinity of said first platen.

10. In molding apparatus of the type having a frame;

opposed first and second mold halves;

a stationary platen connected to said frame for carrying said first mold half; a movable platen connected to said frame for movably carrying said second mold half in reciprocating motion relative to said first mold half;

a plurality of tie rods for guiding movement of said movable platen relative to said stationary platen, said tie rods being normally supported at opposed portions thereof by said frame and said stationary platen and slidably supporting said movable platen; and means for reciprocating said movable platen relative to said stationary platen to bring said mold halves together for receiving material to be molded and for separating said mold halves to permit removal of a molded part;

the improvement comprising:

fluid pressure actuable clamping means connected to said stationary platen for releasably securing at least one of said tie rods to said stationary platen, said clamping means comprising:

a pair of clamp arms pivotably connected at one end to said stationary platen and having at the opposite ends thereof opposed, complementary semi-circular means for alternately, mutually closing to enclose and secure to said stationary platen and opening to release from connection with said stationary platen an end of said one tie rod extending through said stationary platen; opposed, mutually connected linking members individually extending in symmetrical, mutually inclined, angular relation to opposed points of connection with said clamp arms, a pin connector coupling said linking members at said mutual connection, the longitudinal axis of said pin being contained, when said semi-circular means is closed, in a plane defined by the longitudinal axis of said tie rod and the axis of rotation of said pivotal connection of said clamp arms to said platen, and fluid pressure actuable translating means for translating said pin connector relative to said opposed connections to increase said angular relation and open said semicircular means and to decrease said angular relation and close said semi-circular means, and retracting means operably associated with said movable platen for retracting said one tie rod from between said movable and said stationary platens.

11. A molding apparatus comprising:

a frame;

opposed first and second mold halves; a stationary platen carrying said first mold half;

a movable platen carrying said second mold half;

a plurality of tie rod means extending between said frame and said stationary platen such that at least a selected one of said tie rod means includes a projecting portion extending beyond a rear side of said stationary platen facing away from said frame means;

said movable platen being guided by said tie rod means, first power actuating means for reciprocating said movable platen relatively toward and away from said stationary platen to bring said mold halves together for receiving molding material and to separate said mold halves to permit removal of a molded part;

a clamping means mounted on said stationary platen, said clamping means comprising:

first and second movable clamping arms, and second power actuating means connected to said clamping arms for moving said clamping arms into clamping engagement with said projecting portion of said selected tie rod means to secure said selected tie rod means against movement relative to said stationary platen;

brake means mounted on said movable platen and including:

a brake element movable into braking engagement with said selected tie rod means to secure said selected tie rod means for movement with said movable platen, and third power actuating means for moving said movable brake element into braking engagement with said selected tie rod means;

control means for partially retracting said selected tie rod means in a first retracting phase comprising:

a. means connected to said second and third power actuating means for actuating said second and third power actuating means to unclamp said selected tie rod means and shift said braking element into braking engagement with said selected tie rod means at a first location thereof, and b. means connected to said first power actuating means for actuating said first power actuating means subsequent to actuation of said second and third power actuating means to shift said movable platen away from said stationary platen and thereby partially retract said selected tie rod means to a first given distance from said stationary platen, control means for further retracting said retracted tie rod means in a second retracting phase comprising:

a. means connected to said third power actuating means for actuating said third power actuating means, subsequent to shifting of said selected tie rod means by said first power actuating means to release said selected tie rod means from said movable platen; and b. means connected to said first power actuating means for actuating said power actuating means, subsequent to release of said selected tie rod means by said third power actuating means, to shift said movable platen toward said statonary platen relative to said partially retracted tie rod means, and c. said means that is connected to shift said braking element into braking engagement;

said last-named means being connected to said third power actuating means to shift said braking element into braking engagement with said partially retracted tie rod means at a second location thereon which is closer to said projecting portion than said first location; and d. said means that is connected to shift said movable platen away from said stationary platen;

said last-named means being connected to said first power actuating means to shift said movable platen away from said satationary platen, subsequent to said engagement of said braking element at said second location, to further retract said partially retracted tie rod means to a greater distance from said stationary platen permitting mold replacement.

* * * * *